US009690452B2

(12) United States Patent  
Seliger et al.

(10) Patent No.: US 9,690,452 B2  
(45) Date of Patent: Jun. 27, 2017

(54) SYSTEM AND METHOD FOR INTERNET META-BROWSER FOR USERS WITH DISABILITIES

(76) Inventors: Jonathan Seliger, Toronto (CA); Manny Sandler, Toronto (CA); Vernon Lun, Markham (CA); Anthony Warren Lee, Markham (CA)

( * ) Notice: Subject to any disclaimer, the term of this patent is extended or adjusted under 35 U.S.C. 154(b) by 816 days.

(21) Appl. No.: 13/642,945

(22) PCT Filed: Apr. 26, 2011

(86) PCT No.: PCT/CA2011/000455  
§ 371 (c)(1),  
(2), (4) Date: May 23, 2013

(87) PCT Pub. No.: WO2011/130839  
PCT Pub. Date: Oct. 27, 2011

(65) Prior Publication Data  
US 2013/0246904 A1    Sep. 19, 2013

Related U.S. Application Data

(60) Provisional application No. 61/327,264, filed on Apr. 23, 2010.

(51) Int. Cl.  
*G06F 17/00* (2006.01)  
*G06F 3/0484* (2013.01)  
*G06F 3/0481* (2013.01)  
*G06F 11/34* (2006.01)

(52) U.S. Cl.  
CPC .......... *G06F 3/0484* (2013.01); *G06F 3/0481* (2013.01); *G06F 11/3438* (2013.01); *G06F 11/3476* (2013.01)

(58) Field of Classification Search  
CPC .......... G06F 17/2247; G06F 17/30905; G06F 17/227; G06F 17/3089; G06F 17/24  
USPC .................................................. 715/234, 865  
See application file for complete search history.

(56) References Cited

U.S. PATENT DOCUMENTS

| 6,459,364 | B2 | 10/2002 | Gupta |
| 6,665,642 | B2 | 12/2003 | Kanevsky et al. |
| 6,850,252 | B1 * | 2/2005 | Hoffberg ............ G06K 9/00369 348/E7.061 |

(Continued)

FOREIGN PATENT DOCUMENTS

WO    2007/125370 A1    11/2007

*Primary Examiner* — Scott Baderman  
*Assistant Examiner* — Hassan Mrabi  
(74) *Attorney, Agent, or Firm* — Eugene Gierczak; Miller Thomson LLP

(57) ABSTRACT

The present invention is a system and method operable with generally available browser technology that may facilitate improved access and navigation of the Internet and worldwide web by a user who is a novice user or is a user with disabilities. A browser plug-in component may cause the display of buttons, indicators and/or textual information to a user to aid a user in accessing and navigating the webpages. The buttons, indicators and/or textual information may be provided as an overlay on existing webpages. The overlay and webpage display may be tailored to specific users at a point in time and over time so that the overlay elements may reflect user preferences and/or a level of access/navigation activities that is appropriate to the user.

19 Claims, 7 Drawing Sheets

(56) References Cited

U.S. PATENT DOCUMENTS

| | | |
|---|---|---|
| 7,010,581 B2 | 3/2006 | Brown et al. |
| 7,062,547 B2 | 6/2006 | Brown et al. |
| 7,194,411 B2* | 3/2007 | Slotznick ................. G09B 5/06 704/1 |
| 7,454,526 B2 | 11/2008 | Brown et al. |
| 2006/0064504 A1* | 3/2006 | Rechterman et al. ........ 709/238 |
| 2006/0190542 A1 | 8/2006 | Rhoades |
| 2008/0119953 A1* | 5/2008 | Reed ................. G06F 17/30017 700/94 |
| 2008/0201422 A1 | 8/2008 | Peccora et al. |
| 2009/0030996 A1* | 1/2009 | Saito ........................ G06F 8/60 709/206 |
| 2009/0313582 A1 | 12/2009 | Rupsingh et al. |
| 2011/0066636 A1* | 3/2011 | Guido et al. ................. 707/769 |

* cited by examiner

Type in ONE of the following:

- to search, type in the the text to search  *For example,  tennis shoes*
- to browse, type in the web or Internet address (URL)  *For example,  www.intouchlink.com*
- to find a map, type in the physical address or location  *For example,  29 Main St, Toronto*

Then click on the corresponding button to continue

31

SYSTEM AND METHOD FOR INTERNET META-BROWSER FOR USERS WITH DISABILITIES

This application claims the benefit of U.S. Provisional Patent Application Ser. No. 61/327,264 filed Apr. 23, 2010.

FIELD OF INVENTION

This invention relates in general to the field of a system and method for Internet web browsing that may be utilized by novice users or users with disabilities.

BACKGROUND OF THE INVENTION

The Internet has become an important source of information and communication between persons. For example, emails may be used to exchange messages, websites may be accessed to receive information, such as news stories, instructions to purchase an item, etc., intranets can provide details relating events specific to a particular institution. Use of the Internet and the world-wide-web has expanded to a point that there is hardly a demographic sector of society that cannot take advantage of the benefits of these sources, such as the availability of informational and communication sources.

Unfortunately, computers in general and the dominant, popular Internet browsers available on computers are not very easy for everyone to use. For example, many webpages contain crowded information and are confusing or difficult to navigate for some users. In particular, the Internet and world-wide web remain difficult to access and navigate for persons with particular disabilities, including persons with limited sight and persons unfamiliar with computers, the Internet and the world-wide web, such as senior citizens.

Various innovations have been proposed in the past to address the needs of senior citizens and persons with disabilities who want to access, navigate and utilize the Internet and world-wide web. These innovations generally involve specialized or non-standard equipment, improved training, and online help. These solutions increase the costs of the hardware or software required to access and navigate the Internet and world-wide web and furthermore require investments of time to achieve a level of proficiency. Other proposed solutions involve modification of webpages before these are delivered to a user. Therefore, the user does not have access to the whole of a website.

For example, U.S. Pat. No. 6,665,642 discloses an invention to provide improved access to Internet websites for those with special needs by way of a platform which interprets and translates webpages for users with special needs, where the original webpages are not necessarily modified for users with special needs. This invention includes a Translator/Mediator Server that is located between the user and the website. Generally this invention involves the requirement for markup codes within the webpage to make such translation possible. Therefore the invention provides the user with access to a version of a website translated to accommodate the user's special needs. For example, a person who is seeing-impaired may receive a parsed version a website whereby the parsing performed by the Translator/Mediator Server outputs a webpage to a user having font, icons, graphics, etc., in an increased size. This invention provides as examples of transformation; text-to-speech transformation, speech recognition, audio-to-video transformation, image recognition, grammar simplifiers, semantic parsers. The use of various configurations of servers is disclosed, including as a plug-in to the user's browser to perform the transformations.

U.S. Pat. No. 7,010,581 discloses an invention wherein a proxy machine retrieves a webpage for a user, and then injects the user selected browser function controls into the webpage itself. The browser controls on the page itself are also transformed in a likewise manner. Generally the invention involves a proxy mechanism for transforming a webpage for improved accessibility according to a set of preferences previously stored by the specific user requesting the page.

U.S. Patent Application No. 2006/0064504 discloses a Website that utilizes a Rules Engine to determine an expertise level of a User for one or more topics on a Webpage. To make this determination the Rules Engine may analyze User related data, such as the search term used by the User to find the Website, the past products purchased by the User, the path through the Website taken by the User, the usage history by the User on the Website, the demographics of the User and/or the self declared expertise level of the User, to determine a technical expertise level of the User for the topics on the Webpage. The invention may further utilize a Display Engine to customize a Webpage based on the expertise levels of a User so that topics on the Webpage are presented in a manner most appropriate for the User. Furthermore, an Email Engine may be used to customize emails to the User so that topics in the email are presented in manner most appropriate for the User. Additionally, a Support Entity Engine may also be used to route incoming support inquiries from a User to an appropriate technical support person for the User.

U.S. Patent Application No. 2006/0190542 discloses a means of facilitating email communication between an elderly individual and registered friends and family by displaying photographs received by email from registrants on a monitor display screen. Visual indicators may be displayed on the screen in association with photographs of registrants from whom emails have been received. A selection means may also be provided for selecting a photograph having an associated visual indicator. Upon selection, text emails received from registrants are converted to an audio format and the emails are played. The individual can also send recorded emails to a registrant whose photograph is selected.

U.S. Patent Application Publication No. 2008/0201422 discloses an invention that permits a patient at a senior care facility to send and receive messages via the Internet. The messages may be audio, video or text and the system helps the patients navigate through the process of sending and receiving messages. The system provides tools to manage the patients, the patient's relative contact, mail and photo collection.

U.S. Patent Application No. 2009/0313582 discloses a computer interface operable to provide a user with a selected subset of features. The invention may be used to navigate a software interface, which a user may interact with through an input means. Program options may be displayed to the user as icons through the software interface and each may correspond to an active program, which may be selected through selection of a program option. The software interface may display basic commands relating to the active program as icons that use may select. Alternatively the user can return to the program options.

ELDY offers computing features directed at seniors (see: www.eldy.eu) using a simplified user interface with large buttons and features to improve the readability of screen content, such as a magnifying feature. ELDY offers the following features: Linux and Windows software supporting email, chat, web browsing, weather news, photographs, documents, news, text editing, streaming and tutorials.

Touchtown Digital Signage provides a multi-window display for community information (see: http://www.touchtown.us/welcome/products/digitalSignage.aspx). For example, the community information may include announcements, weather, activity, schedules, menus, and other information.

SUMMARY OF THE INVENTION

In one aspect, the present disclosure relates to a system for providing one or more browser functions operable by a novice user or a user with disabilities, characterized in that the system comprises: a computer device linked to a display device; a browser interface operable by the computer device to provide access to one or more activity pages, including access to one or more webpages; and a browser plug-in component operable with the browser interface to provide to the user one or more function options corresponding to the one or more activity pages, said function options being presented to the user at an expertise level being appropriate for the user to access and navigate the one or more activity options.

In another aspect the present invention relates to a method of browser functions for accessing and navigating one or more options by a novice user or a user with disabilities, characterized in that the method comprises the following steps; initiating a browser session by authenticating the user; recognizing an expertise level of the user for the browser session; providing one or more function options to the user including accessing one or more activity pages, including one or more webpages, and presenting said one or more function options to be compatible with the expertise level of the user; and the user utilizing the one or more function options to access and navigate the one or more activity pages.

In yet another aspect the present invention relates to a system for providing one or more functions to overlay one or more webpages operable by a novice user or a user with disabilities, comprising: a computer device linked to a display device; a browser interface operable by the computer device to provide access to the one or more webpages via the Internet; and a browser plug-in component operable with the browser interface to overlay one or more of the following elements on the one or more webpages: one or more buttons operable by a user to activate and cause the performance of browser functions; one or more indicators operable to indicate operations of the computer device or Internet to a user; and one or more textual information operable to provide information to a user; whereby the content of the one or more webpage may be fully accessible by the user; and wherein the overlay elements generate improved access and navigation of the one or more webpages by the user.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
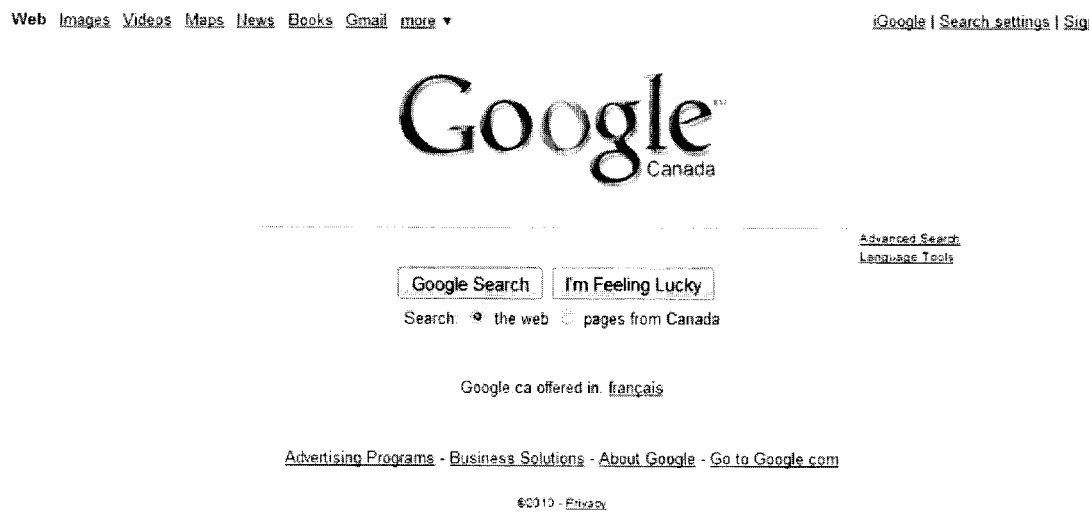
FIG. 1 shows a screen displaying overlay buttons that may be operable by a user in an embodiment of the present invention.
Figure 1:
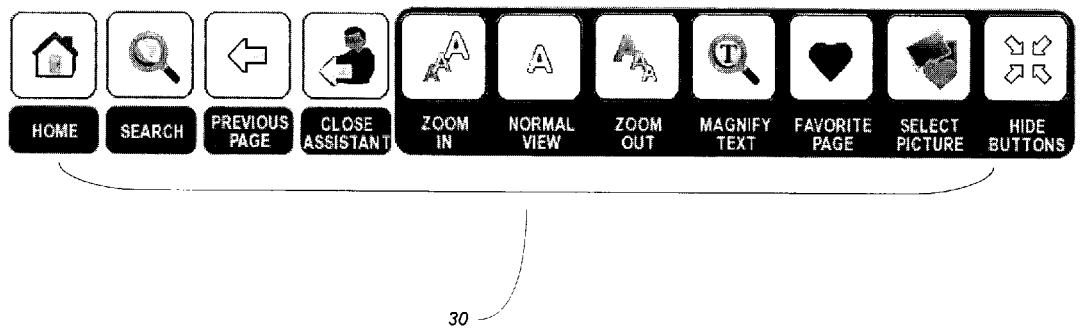

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The present invention is a system and method operable with generally available browser technology that may facilitate improved access and navigation of the Internet and world-wide web by a user who is a novice user or is a user with disabilities. A browser plug-in component may cause the display of buttons, indicators and/or textual information to a user to aid a user in accessing and navigating the webpages. The buttons, indicators and/or textual information may be provided as an overlay on existing webpages, whereby the content of the webpage is provided to a user as it appears through a general browser with overlaid buttons indicators and/or textual information. At least one of the buttons, indicators and/or textual information may be displayed to a user, even as a webpage is scrolled left-to-right or top-to-bottom, and may be moveable by a user, to uncover otherwise covered areas of the webpage, and thereby cause the whole of the webpage to be visible to the user. The overlay and webpage display may be tailored to specific users at a point in time and over time so that the overlay elements may reflect user preferences and/or a level of access/navigation activities that is appropriate to the user.

The present invention may offer benefits and advantages over the prior art, and may in particular provide a system and method for Internet web browsing that may be utilized by novice users, users with disabilities, or users wanting a simpler, cleaner user experience. The present invention may generally be utilized to enhance a standard browser experience, but providing personalized access for a user to general web pages accessible through the Internet. The personalized access may provide access that is easy to navigate and utilize for users, and may provide access to common web features, for example, such as email and other web features provided by a trusted website, in a manner that is easily understood and utilized by the user.

In one embodiment of the present invention, the present invention may operate in a cloud computing environment. In this manner, the present invention may be accessible from anywhere. The present invention may also be accessed by authorized persons who are not the user, for example, such as a family member of a user. This access by an authorized person who is not the user may be through cloud computing, or through other Internet access environments or protocols. The family member of the user may access the present invention to set up the Internet navigation environment that will be provided to a user by the present invention on behalf of the user, as described herein. For example, an authorized person may update a user's favourites to assist a user in accessing particular webpages and/or websites.

The present invention may be include a trusted website that is operably connected with a browser plugin. The browser technology incorporated in or integrated with the present invention may be known prior art, such as a Netscape™ Plugin Application Programming Interface, or other browser technology designed specifically for use in or with the present invention.

The browser plugin may be tailored to a user's requirements, as described herein. The present invention may be operable to store regularly utilized data relating to a user or a user's preferred Internet navigation experience. The stored data may be utilized to adjust the experience of the Internet navigation presented to the user by the present invention. For example, such as the command buttons provided to a user, the layout or design of a screen presented to a user, or other features of Internet navigation experienced by a user. The stored data may be further utilized adjust the Internet navigation presented to a user in accordance with the user's abilities and experience with Internet navigation. A user's abilities and experience with Internet navigation may alter over time. The stored data may be utilized to alter the Internet navigation presented to a user in accordance with such changes in a user's abilities and experience with Internet navigation, so as to provide a user with an Internet navigation experience that is appropriate to a user's abilities and experience each time a user logs into the present invention.

The present invention may incorporate a variety of embodiments. A Trusted Website, or another linked page or site, may authenticate or register users. A browser plug-in may provide functionalities as an overlay to one or more webpages, such as buttons to activate browser functions. Such buttons may be of a format (e.g., shape, size, icon, having text thereupon, etc.) to assist a novice user or a user with a disability to access or navigate webpages. Also, the browser plug-in may be operable to provide one or more webpages that offer a user access to many operations, such as, for example access to chosen webpages, viewing of photographs, displaying, drafting, saving and sending email, access to institutional member-only webpages, as well as other operations. The operations may be adapted to provide features matching the capabilities of the user. In one embodiment of the present invention the browser plug-in and Trusted Website may be interoperably linked, and thereby be operable to function in a compatible manner to perform operations, such as storing user information.

For the purpose of this application the term "Internet" will include the Internet and the world-wide web. For the purpose of this application the term "user with disabilities" will include any of the following: a senior citizen, a partially blind or weak-sighted person, a person with limited dexterity, a person with learning disabilities, any person unfamiliar with use of a computer or any digital medium, or any person having any other disability or challenge that causes use of mainstream computers and digital medium infrastructures to be difficult. For the purpose of this application the term "display" will include not only visual display, but audio or other types of presentations.

In one embodiment the present invention may provide a system for navigating and accessing webpages. The system may include one or more computer programs interfaced with hardware and software components. The components may include a computing device with a user interface and display means, as well as a connection to a computer network, such as the Internet. A browser, which may be one of several popular general browsers, that may be capable of supporting javascript, may be operable by the computer device and in accordance with user input. A browser enhancement module may be connected to the browser component as a plug-in component. The plug-in component may be installed by download via the network. The download may be automatic. The plug-in may be able to interact with the content of the webpage accessed by the browser. The plug-in may dynamically augment the content of accessed webpages.

The present invention may support a trusted website or other means of authenticating and registering users. User parameter information may be provided and stored to the browser plug-in.

The browser plug-in may operate in accordance with a set of software instructions, represented as one or more computer programs, to provide interface buttons, links and other information that may be displayed to appear as an overlay upon an accessed webpage. In some embodiments of the present invention, the overlay may not alter, change or transform the content of the accessed webpage. The buttons, links and other information provided by the present invention as an overlay may be prominent and easy-to-use by a user and may activate a plurality of functions and services when selected by a user. For example, the buttons, links and other information may cause a webpage to be easier to access, read, navigate and store. Buttons, links and other information may also be customizable to reflect the requirements, preferences, expertise level and/or disability of a user.

Additionally the present invention may provide access to webpages created specifically for the users of the present invention, a Trusted Website. These may direct the user to information about an institution, provide calendar functions, provide weather information, offer other webpage formats, access and functionalities. A set of software instructions, provided by one or more computer programs may operate the Trusted Website to cause it to provide computing features that may be desired by the user. The computing features may vary in complexity, layout, size on the screen and density of information in accordance with the expertise level or disability of the user. The computing features may be operably interconnected with the software instructions of the browser plug-in. For example, the computing features may be operably interconnected by using HTTP Internet Protocol messages, by using an embedded scripting language such as Javascript, or by using other means. The computing features may convey information about the user to the said browser plug-in. The interconnectivity may further provide computer memory storage facilities for information captured by the browser plug-in as a private data storage area for one or more users.

The present invention may provide additional components to native controls of generally available web browser technologies. The present invention may provide such components by the means of a browser plug-in. For example, the present invention may display one or more buttons on a webpage, said buttons being operable to perform functions relating to the webpage, such as common computing functions. To utilize the buttons each button may be activated by a click of a mouse, a touch on a touch screen, touch of a key on a keyboard that is configured to activate the button function, or any other activation means. Other than the appearance of the buttons on the screen the appearance of the webpage will not otherwise be changed by the display of the one or more buttons.

The buttons may activate functions of the Internet, such as access of a home page, access of a search engine, access of a previously accessed webpage (movement backwards or forwards). The buttons may also activate functions relating to the display of a webpage or the display of the buttons. For example, the buttons may increase the font of the webpage, zoom in on or out from a section of the webpage, close or open any of the buttons, display a normal view of the webpage, magnify selected text, add the webpage to the user's list of favourite webpages, select a picture on the webpage (and also copy and/or store this picture). A skilled reader will recognize that buttons for other functions of the Internet and display of a webpage or display of buttons, may be included in an embodiment of the present invention and that buttons may appear in a variety of combinations. An example of a display of buttons 30 possible in one embodiment of the invention is shown in FIG. 1.

The buttons may be provided as a browser widget that is a plug-in component operable to support the display of the buttons as an overlay visible to the user when a webpage is accessed. In one embodiment of the present invention the buttons may be provided as a toolbar, for example, such as with a computer device that is a tablet, such as an iPad™.

A skilled reader will recognize that the position of the buttons may be determined in accordance with several criteria, including the disability of the user and/or the placement that causes the buttons to be more easily visible to the user. In one embodiment the buttons may be positioned either individually or as a group by the user, for example, such as by dragging the buttons. This may permit the user to move the buttons to uncover and thereby display particular areas of the webpage. This may be particularly useful to a user if the webpage is enlarged to a size that is larger than the computer screen and moving the buttons may expose and thereby display regions of interest on the webpage. In another embodiment of the present invention a collection of buttons may be minimized and in a minimized state a single button, or a selection of buttons, may be displayed to the user. The minimized button may be positioned on the screen by the user, for example, such as by dragging the button. The minimized button may be activated and cause the group of buttons to be displayed again, thereby ending the minimized state.

The buttons may offer several benefits. Each button may be large and therefore easy to click upon. Each buttons may include an icon identifying its function, for example, such as an arrow to indicate a function that will navigate backwards or forwards through accessed webpages. Each button may be accompanied by a text label describing the function operable through activation of the button. These features of the one or more buttons may cause the buttons to be easily recognized and utilized by person with disabilities. For example, such as persons with limited sight who will be able to see a large button, but may not be able to see smaller icons on a native webpage, and persons with limited dexterity will be able to activate the buttons. A skilled reader will recognize that benefits for other persons with a variety of disabilities may be achieved by the buttons of the present invention.

Additionally, buttons may only be displayed if the function of the button is available, for example, such as a button operable to navigate backwards to a previously accessed webpage may only be displayed when a webpage has been accessed previous to the webpage displayed presently for the user. As another example, buttons to shift the content display to any or all of the left, the right, the top, or the bottom of the screen may be provided if the content is larger than the screen display, so that all of the content cannot appear on the screen simultaneously, and therefore the content must be shifted in order for portions of the content to be displayed. This offers the benefit of limiting the functions offered by the buttons to represent the functions that the user may truly undertake at a specific point of accessing and navigating the Internet. This may lessen the confusion of a person utilizing the present invention regarding the available options he or she may choose and may also increase the learning curve and/or comfort level of a person who is not familiar with the Internet as they learn to access and navigate the Internet.

It is also possible that buttons may be displayed, or not displayed, or the size of the buttons may alter, to reflect the expertise level of the user. A skilled reader will recognize that a user may specifically set the buttons not to change, to permit more comfortable use of the invention in accordance with a user's disability, or may alter the buttons willfully, or the system may alter the buttons in accordance with the expertise level of the user. This may offer the benefit of allowing the user to learn during use of the present invention and to have this learning reflected in the embodiment of the invention offered to the user over time. It further may offer the benefit of reflecting the improving or worsening disability affecting a user. For example, for persons with worsening disabilities, such as deteriorating eyesight, the buttons displayed may reflect a lessening expertise level over time and more reliance upon the buttons to access and navigate the Internet. As another example, for a person with improving dexterity, such as a person undergoing rehabilitation, the buttons displayed may reflect an increasing expertise level over time and a diminishing reliance upon the buttons to access and navigate the Internet.

A further benefit that the buttons may offer is that buttons that are used on different webpages and in different environments, such as email, may have a consistent look. The consistent look of a button may include that the button is presented as a consistent size. This consistency may indicate that the button performs a common function, for example, such as activating backwards movement to a prior page. This may increase the speed of the learning curve of users, and also may diminish the confusion of users.

In one embodiment of the present invention the method and system of the present invention may be operable to add white space to a webpage as it is presented to a user. The white space may be added for a variety of purposes, including providing content of a website to a user in a clear, organized, spaced manner. Such a presentation may lessen the complexity of a webpage's contents, as experienced by a user. This may be particularly helpful to a novice user, or a user with disabilities, to understand the content of a webpage. The white space may further be added into the presentation of a webpage by the present invention to a user to allow a user to scroll down through webpage content, so that the scrolling moves the content past any buttons appearing on the webpage as it is displayed to a user.

Another embodiment of the present invention may provide link mappings to aid users incapable of activating buttons, or users who prefer to utilize keyboard keys to activate functions of the present invention. When activated the link mapping function may cause the webpage display to be overlaid with a set of visible alphanumeric characters, corresponding to characters that are mapped to keys on a keyboard. For example, the character "S" may overlay an area of the webpage offering a "Submit" function. The Submit function may be activated by the user typing "S" on the keyboard. If a character appears as an overlay more than once on a webpage to indicate more than one function offered by the webpage, when a user types the character the system will query the user to clarify which function offered on the webpage that the user intends to activate. Once the user responds to the query the chosen function will be activated.

The cursor displayed on the webpage and utilized to access and navigate the webpages may be displayed in a say specifically to assist users, for example, such as a larger cursor or a cursor with a trail. The size of the cursor may be adjustable to reflect a user's disability and expertise level. For example, a user having limited sight may permanently choose a large cursor to be displayed. As another example, a user learning to access and navigate the Internet for the first time may initially have a large cursor displayed, but as the user's expertise level increases the size of the cursor may decrease. Any alteration in the size of the cursor may be determined by the user specifically, or may be automatically determined by the system in accordance with the user's expertise level.

Features of the present invention may be tailored to an individual user and this tailoring may alter over time, for example, such as: the scope of Internet access (including webpages that may be accessed, for example such as webpages recommended to the user by the Trusted Website); chosen functions offered to a user (such as access to email, access to a particular institution's information pages, etc.); the look and size of the buttons, cursor, webpage display, etc.; the ability of the system to alter aspects of the invention (such as the buttons displayed) in accordance with the expertise level of the user. A skilled reader will recognize that other features of embodiments of the present invention may also be tailored to an individual user.

Function choices offered to a user and indicators of other operations of the present invention may be displayed to the user. The function choices and indicators of operations of the Internet may be further displayed in a manner that is clear to inexperienced and practiced users alike. For example, an indication may be displayed in the middle of the webpage to indicate when downloading is occurring, or another waiting period is occurring during which period the user should not activate any function of the Internet, such as during the time when the Internet is navigating and accessing a requested webpage. The clear display of function choices and indicators of operations of the Internet to the user may decrease confusion of a user as to whether the Internet is functioning, which may in turn decrease the likelihood that a user will attempt to reinitiate a previously activated function because the user is under the impression that the function was not activated. Reactivation of previously activated functions can slow down the Internet and complicate navigation, which can cause the user to experience confusion and frustration. Also the clear display of function choices and indicators of operations of the Internet to the user may increase the rate at which a user learns to access or navigate the webpages, this may cause the experience level of a user to increase more rapidly than it would when using the native web browser application in isolation. For example, buttons may be utilized to indicate function choices, or a flashing screen may be utilized as an indicator of operation of the Internet, or an icon with an arrow moving across the screen that repeats this activity during processing by the Internet may be utilized as an indicator of operation of the Internet. A skilled reader will recognize that the function choices and indicators of operations may be of a variety of forms and display types.

Figure 2:
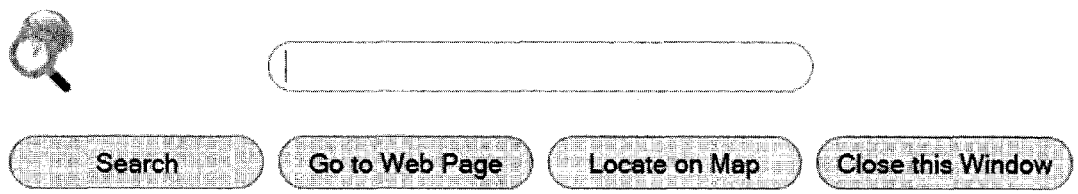
FIG. 2 shows an example of buttons and information of the present invention that may be displayed as an overlay to accompany a search engine.

The web search capabilities, for example, such as are offered by a search engine, such as Google™, may be accompanied by buttons or displayed information that cause the web search to be easy to access and to utilize. For example, displayed information may suggest search term formats to a user to simplify searching. As another example, a button may be displayed to a user that is operable to activate a specific type of searching, such as searching a map or location, or searching for a web page. An example of an embodiment of the present invention offering such accompanying buttons and displayed information 31 is shown in FIG. 2.

The present invention may include an authorization page operable to authenticate a user. Authentication may operate utilizing a variety of methods and protocols, for example, such as provision of a username and password by a user. An unauthenticated user may sign-up as a new user at the authentication page. The authentication page may be, or may be linked to, a website that is a Trusted Website.

The Trusted Website may be a home site for a user. It may support interactions, functions, and settings specific to a particular user. These setting may be chosen by the user, or may be altered by the system as the system gathers information pertaining to a user. For example, if the user initially sets elements of the present invention to be alterable for that user, the system may alter elements of the site displayed to the user, such as buttons, in accordance with the expertise level of the user, in the manner described above. As another example, the system may store information regarding webpage display options, such as zoom-in options, utilized by a user on a frequent, or regular basis and may automatically display webpages accessed by the user utilizing the present invention at the frequently, or regularly utilized setting as the default setting. A skilled reader will recognize that a variety of information may be gathered by the system and analyzed by the system to indicate that elements of the present invention should be altered for a specific user.

Figure 4:
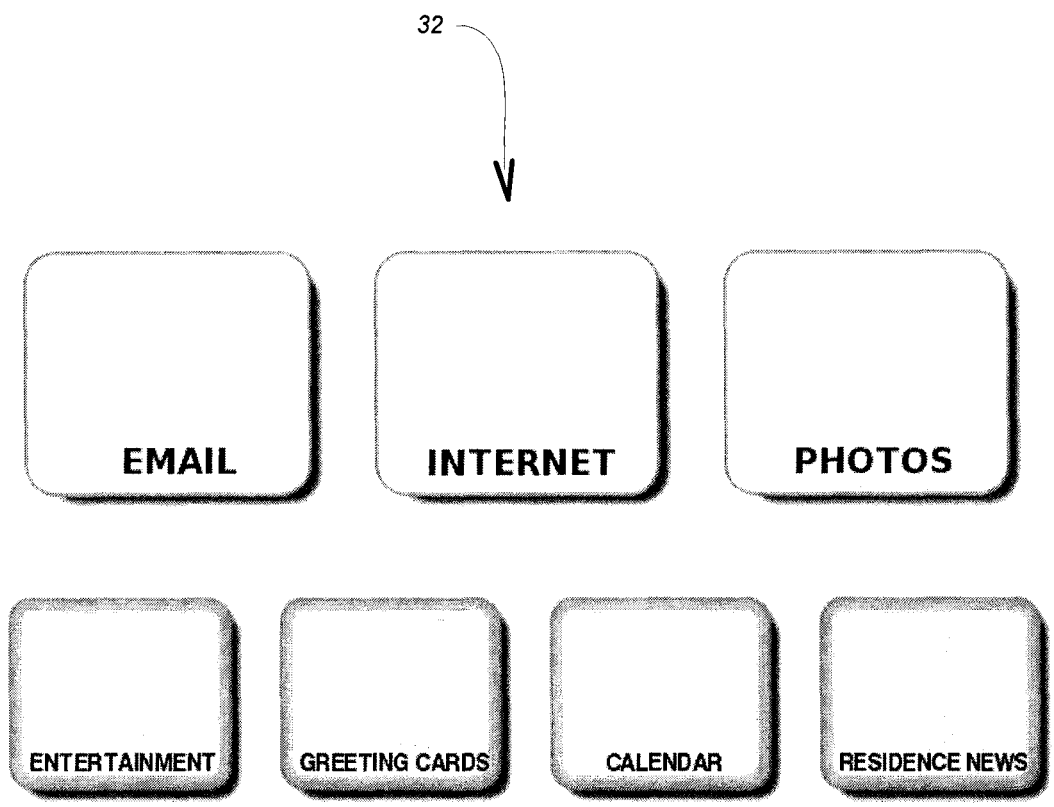
FIG. 4 shows option buttons that may be displayed as user options in a page including in an embodiment of the present invention.

A Trusted Website may display an initial web page for a user that includes specific browser options, such as specific buttons to access email, Internet, photos, pages offering information pertaining to a particular institution, weather information, a calendar application, entertainment sources, or other functions. An example of possible buttons 32 displayed on an embodiment of the present invention is shown in FIG. 4. A skilled reader will recognize that a variety of browser options may be provided through a variety of means and/or displays on the Trusted Website. In one embodiment of the present invention the user may be provided with an option to configure his own preferences for one or more browser options to be displayed on the website. In another embodiment of the present invention a home button may be displayed on other webpages accessed by the user and upon activation of the home button the user may be returned to the Trusted Website.

An embodiment of the present invention may also support category-attached bookmarks. The option to activate the function of a category-attached bookmark may allow a user to store the location reference information pertaining to any resource, for example, such as a website, a webpage or a portion of a webpage (such as an image, photograph, a video clip, a game, etc.), or another resource, to a favourites list.

The resource can be relocated and accessed through selection of the resource from the favourites list.

The present invention may offer several benefits over the prior art. For example, the present invention may address some of the reasons why seniors citizens and person with disabilities find using personal computers and the Internet a challenge, including the following:

- they are new to the technology and are confused by the concepts and terms that are presented;
- they suffer from some physical impairment, such as limited eyesight or unsteady hands;
- they are working on equipment that is limited in some respect, such as a computer device having limited memory capacity;
- they do not have the alertness or the patience to cope with inappropriately-defined technology;
- they forget to perform actions if not reminded, such as checking for email;
- they do not know how to get help when they encounter problems.

By providing an invention that addresses these limitations and experiences of segments of society the invention accommodates the needs of growing demographics (e.g., senior citizens and persons with disabilities).

Another benefit of the present invention is that it may not reconfigure or transform web pages. Most prior art examples are dependent on the transformation of a webpage prior to submission to the browser. The present invention provides either webpages configured specifically for the users, such as a Trusted Website, or will overlay buttons or indicators onto webpages and otherwise display the web page in its original form.

Still a further benefit of the present invention is that while prior art examples use a proxy machine to retrieve a webpage for a user, and then inject the user selected browser function controls into the webpage itself and transforms browser controls on the page itself in a likewise manner, the present invention does not undertake these steps. The present invention does not use an external proxy server that intercepts the webpage request and transforms the returning webpage before it reaches the browser. The prior art approach has the result that, once transformed, the webpage cannot be further changed. As discussed above the present invention applies an overlay to an existing webpage and therefore does not transform a webpage prior to the page reaching the browser. As a consequent a user utilizing the present invention is capable of viewing all of the content provided by the webpage in the same format as it is displayed when the webpage is accessed without utilizing the present invention. The addition of the overlay of the present invention offers the user overlay buttons and indicators that improve the ease of access and navigation of webpages experienced by the user.

Yet another benefit of the present invention is that it does not rely upon other persons to monitor the use of webpages, email or other functions by a user. Some prior art links a supervising user, account manager, or enabling intermediary, such as for example a relative or other account supervisor, to a user's account so that the supervising user can facilitate monitoring and notifications to a user. For example, a supervising user can recognize that a user has not read his or her email messages within a period of time, and the supervising user may remind the user to read his or her messages. The present invention may include a reminder feature, whereby if a user has not checked his or her email the system will send a reminder, likely as an indicator to a user, the indicator may be text, audio, video or any other form. In one embodiment the user may be required to respond to the notice to confirm that the user has read the notice. A skilled reader will recognize that the present invention may offer a variety of notices for example, such as reminders to send cards for special events, reminders to pay fees to a specific institution, notices to check email, etc. A skilled reader will also recognize that all of or some of, the notices and reminders to be applied by the system may be chosen by a user, or may be set as default notices and/or reminders by the system.

As another benefit of the present invention over the present invention over the prior art, the present invention may be utilized as a wellness or health monitoring tool. In this manner the present invention may pose one or more questions to a user. The user may provide responses to the one or more questions. The responses may be analyzed and reviewed by the present invention, for example, such as analysis that involves an algorithm or other calculation. Based on the results of the analysis the present invention may provide a notification to a family member of the user if the analysis recognizes a change in the user's wellbeing. The notice may be any type of notice, for example, such as an email, or a text message sent to a family member's electronic device. The present invention may also provide a notification to a family member if the user does not respond to one or more of the questions. A skilled reader will recognize the variety of questions, analysis and notices that the present invention may be operable to undertake.

Another benefit of the present invention over the prior art is that the present invention may be adaptable to persons with varying levels of disabilities and inexperience with computers. The prior art includes inventions that apply a rules engine to analyze the behaviour or a user visiting a website to determine the level of expertise of the user. The present invention does not utilize a rules engine or a set of fixed rules to determine the expertise level of a user. The present invention may define metrics for specific operations performed by a user and assign values to such operations. The values may be entered into an algorithm and thereby processed to determine the expertise level of a user. For example, an Activity Indicator metric may record how many different webpages a user visits during a session while a user is utilizing the present invention. The ability to visit multiple webpages may indicate a higher expertise level of a user. A higher number of webpages visited by the user may be reflected by the present invention as a higher Activity Indicator metric value. This value may be utilized with other metric values to contribute to an overall expertise level result for a user. How often a user visits certain key pages, may provide the Category frequency metric, Page frequency metric and/or Feature frequency metric. Other metrics may also be utilized, for example, such as, an Interest indicator, a Complexity indicator, a Page Visits indicator, a Button Frequency indicator, an Email indicator, a Widget Usage Frequency indicator and any other metrics.

The present invention may not be required to alter its application in accordance with the expertise level of a user, may alter to support improved expertise, or may alter to support diminished expertise. Therefore, the present invention can be utilized by persons who have long-term disabilities, such as stable, diminished sight, whose disabilities are unlikely to alter significantly over time. In this case the function of the present invention can remain constant even as the user becomes more adept at utilizing the Internet and other functions offered by the present invention, such as email, greeting cards, calendar, sites for specific institutions, etc. Also, the present invention may provide an altered application in accordance with the experience level of a person who is improving at utilizing a computer and the Internet and other functions of the present invention, such as a person who is learning to use a computer and the Internet, or a person undergoing rehabilitation for a disability. The present invention may additionally provide an altered application in accordance with the experience level of a person who is experiencing a declining expertise level, due to an increasing disability. A skilled reader will recognize the many applications that the present invention may offer a user in accordance with the disability or experience level of an individual user.

The following description of the present invention discloses a possible embodiment of the present invention. A skilled reader will recognize that a number of embodiments of the present invention are possible. Thus, the following represents merely an example of the present invention.

System Overview

A skilled reader will recognize that the system of the present invention may include a variety of components. In particular, the present invention may be operable with hardware and software regularly utilized for Internet or other network connections. For example, a personal computer, such as a desktop, laptop, netbook, etc., having platform loaded thereupon, such as, Microsoft Windows™, Apple OS X™, Linux™ or other platform software, may be utilized as a computer device of the present invention. Other computer devices may include an Apple iPad™, an Apple iPod Touch™, a smartphone device, such as an Apple iPhone™, a RIM Blackberry™, a Google Android Phone™, a Pre™, or any other smartphone device. The computer device of the present invention may operate a browser, for example, such as Mozilla Firefox™, or any other type of browser.

The Trusted Website of the present invention may be a server-based website, supported by an infrastructure running PHP™ software, J2EE™ software, .NET™ software or other software. The present invention may also be implemented as a virtual machine in a cloud computing environment. A skilled reader will recognize that a wide variety of embodiments of the present invention may exist.

Figure 3:
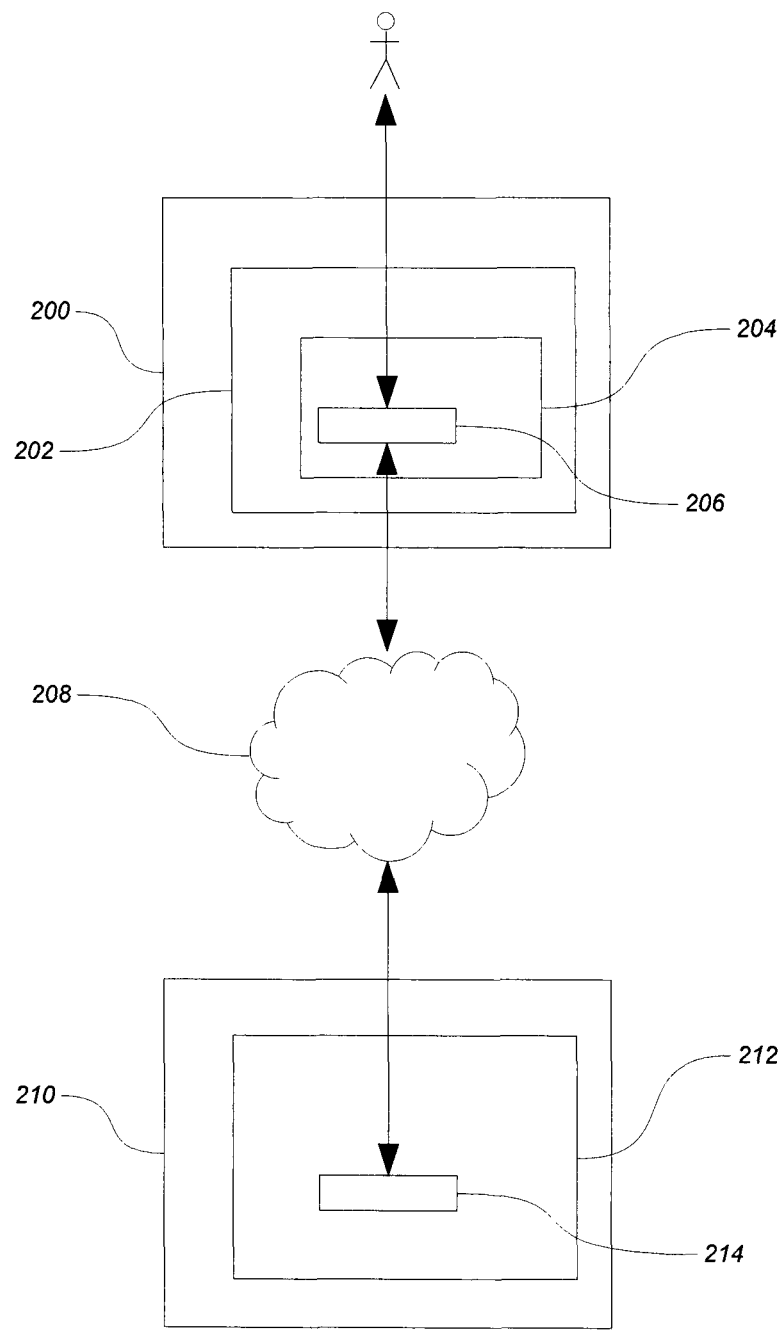
FIG. 3 is a systems diagram of an embodiment of the present invention.

The present invention may be a system operable upon a computer or computing device, for example, such as a laptop or desktop computer, PDA, tablet, computing kiosk, webpad etc. For the purpose of this application the term computer will be used to describe any of the computers or computer devices that can be incorporated in the present invention. The system of the present invention may include a computer device 200, as shown in FIG. 3. The computer 200 may be connected to a computer network 208, for example, such as an Internet connection operable to facilitate access to one or more website. The computer may include a display, for example, such as a screen, said display may be integrated in the computer, or linked thereto by a cable or wirelessly. One or more input means may be linked to the computer to permit input to be processed by the computer, for example, such as a keyboard, a touch-screen or a mouse. The user may utilize the input means to enter data into the computer or activate functions of the computer and the elements the computer is linked to, for example, such as the computer network or Internet. A skilled reader will recognize that a variety of input means may be utilized and that the input means incorporated in the present invention may be chosen in accordance with the disability of a user.

A web browser 202, for example a general purpose web browser capable of operating and running javascript, may be operable by and/or linked to the computer. A plug-in software component 204, that may be downloadable, may be installed within the web browser by the present invention. The plug-in component may have software functions 206 embedded therein, said software functions being operable to activate and control the functions of the present invention, as described in this application.

In one embodiment of the present invention, communication may be facilitated between networked computers by the computer network 208. In another embodiment of the present invention, the computer network 208 may facilitate communication with a single computer. In all embodiments communication facilitated by the computer network may include access to and navigation of the Internet.

One or more web servers 210 may be linked to the computer network 208. The web servers may be one or more public servers accessible via the Internet. An authentication software program 212 may be operable by the one or more web servers. The authentication software program may be operable to recognize and authenticate users registered to utilize the present invention. The authentication software program may also be operable to register new users. The authentication software may be operable to set parameters for the individual user, such as size of text, level of expertise, etc. Said parameters may be set upon registration as well as at later dates, and said parameters may be updated at various points during use of the system by the user. Said parameters may be stored in a private storage area 214 allotted to each registered user. A skilled reader will recognize that a variety of parameters may be set to tailor the present invention to individual users, including parameters discussed elsewhere in this application.

Trusted Website

In one embodiment of the present invention, the authentication software program may also operate a Trusted Website. The Trusted Website may provide the user with access to one or more private data storage areas 214 within the web servers which may store data such as images, photos, emails, the location information for favourite websites, metrics/expertise level pertaining to the user behaviour and other data. A skilled reader will recognize that a variety of data may be stored. Additionally, the Trusted Website may include webpages or other display formats or means for display of the stored data to a user. Said webpages or other display formats or means may be formatted to be easily accessible, navigable, and functioning for individual users, in accordance with a user's experience level, disability or other individual preferences or requirements.

In one embodiment of the present invention the Trusted Website may provide access to, and activation or, functions and services for an individual user. Functions and services may be available through one webpage or multiple webpages. A particular webpage may be designated the homepage. A homepage may be a first page which represents the base of function and service offerings provided by the present invention, or the homepage may be any webpage designated a homepage by either the user of the present invention. A homepage may be the default webpage that is accessed when a user activates a button for accessing the homepage. Accessing a homepage, being a consistent expected page, may be a means of lessening the confusion of a novice user, or user with disabilities, and increasing the rate of the learning by users becoming accustomed to using the present invention and the Internet.

The one or more webpages, or the homepage, may display information deemed important for a user, such as notices, requests, reports of information updates, etc. For example, a notice that e-mails waiting to be read by the user may be displayed.

The Trusted Website may include Interest webpages, accessible by specific users in accordance with the user's parameters, that provide information, functions or services of interest to particular users or user groups. The Interest webpages may be a website or webpage providing information pertaining to an organization or institution that may be of interest to a specific user or group of users. For example, Interest webpages may pertain to a nursing home and may offer information about activities, meals, advertisements, or other information pertaining to that nursing home. If the organization or institution has a website the Interest webpages may be accessed via a link to the relevant website. In one embodiment of the present invention a Webpage Creation Tool may be provided whereby authorized webpage creators for a particular organization or institution may create webpages pertaining to the organization or institution to be accessible via the Trusted Website. A user may choose which Interest websites will be accessible by the user, and/or an organization or institution may choose which users may access its Interest webpages. Access to Interest webpages may be facilitated by the present invention via a Trusted Website for a fee chargeable to the organization, institution, or sponsor (such as an advertiser or funding partner), in some embodiments of the present invention. A skilled reader will recognize the wide variety of Interest webpages that may be incorporated in the present invention and the ways that these may be accessible and utilized by a user.

An example of the functions and services and the presentation of these for activation by the user as buttons 32 is shown in FIG. 4. A skilled reader will recognize that a variety of functions and services may be offered to a user and that the presentation of these and means of accessing and/or activating these functions and services may be of a variety of types.

Some common features of the format of the presentation of the means of accessing and/or activating the functions and services may be represented in many embodiments of the present invention. For example, the Trusted Website may be formatted and offer a presentation that is created to assist non-technical users and users having one or more disabilities, for example, such as unsteady hand coordination, slower than average reflexes, imperfect eyesight, etc. Some features of the webpages of the Trusted Website may include:

large text in simple, clear fonts;
large distinctive buttons and/or indicators with text labels;
consistent placement of one or more buttons, icons and/or text information (said text information may include text links, text labels or other textual representations) on the screen that do not move without user intervention, even if the screen size changes;
a limited number of buttons, indicators and/or textual information may be displayed on a screen simultaneously, and buttons or indicators may be hidden or unhidden to alter the number of buttons, indicators and/or textual information displayed on a screen simultaneously, this may diminish the confusion of a user confronted with options;
buttons may only be displayed when the function represented by the button is applicable;
indicators may be displayed to indicate to a user that processing or other activity is being undertaken by the computer, Internet or other element of the present invention and that the user must wait while the indicator is displayed;
no moving objects, for example, such as scrolling banners, flashing advertising or floating windows, need to be tracked;
only the left mouse button may be useable with the present invention to activate functions and/or services should a mouse be utilized as an input means;
only single clicks of a mouse or touches of a touchscreen or other single entry of an input means use may be supported by the present invention to activate a function or service; and/or
large scroll buttons, some of which may only appear when the scrolling option is applicable, may be displayed to undertake the function of scrolling, and thereby perform the function of a scroll bar, this may be preferable as scroll bars can be difficult for some users to manipulate.

In one embodiment of the present invention the frame that appears around a webpage when it is accessed by a general browser, said frame including toolbars and address bars, will not be displayed. In this embodiment the functions that may be activated by the toolbar and/or address bars, may be represented by buttons.

In another embodiment of the present invention cursor management may be provided. Cursor management may be operable to be customizable by a user. The user may therefore choose from options of one or more large and coloured cursors for display as an cursor overlay on the webpages. A user may also choose other cursor management options, for example, such as mouse trails, and a mouse pointer finder in some embodiments of the present invention. Cursor options and cursor management may be operable by pressing a predefined key combination such as CTRL-Q (control and Q keys) or other input means.

Tailoring

Webpages access, function and services may be tailored for individual users. Tailoring may reflect the disability. The tailoring for a user may remain constant, until it is amended by a user. Alternatively, tailoring may occur in response to the expertise level of a user. As described above, tailoring in accordance with the expertise level of a user may encompass increasing and decreasing expertise levels.

Tailoring in accordance with expertise levels may function in the following manner, although this description is provided merely as an example and a skilled reader will recognize that other tailoring functions may be applied by the present invention.

Each user may be assigned an expertise level that is stored as a parameter pertaining to the user. When a user logs-in and is authenticated, as described above, the stored expertise level is accessed and functions, formats, displays, etc. of the present invention corresponding to that expertise level are applied while the user is logged-in to the present invention. In one embodiment of the present invention, the appearance of the overlays and functionality of the webpages accessed may be provided in accordance with the user's expertise level. For example, a user with a low expertise level accessing the email page will not be provided with buttons for activating formatting options, such as bold, italic and underline. A user with a high expertise level accessing the email page may be provided with buttons for activating formatting options as well as a button for adding attachments to an email. The different functions offered to a user with a low expertise and a high expertise reflect that a simpler, clear set of functions are offered to a user with a low expertise level, and more complex functions are offered to a user with a higher expertise level.

Once the expertise level of a user is determined by the present invention, the usage of the present invention, including the web browser, may be analyzed by the present invention. Should the usage analysis indicate a different level of expertise is achieved by the user (an improvement in expertise or a lessening of expertise) then a new expertise level may be stored as the user logs-off of the present invention. The new stored expertise level will be the expertise level accessed and utilized the next time the user logs-in. As described above, a user may disable the automatic changes in expertise level, or may set his or her expertise level manually at any point while the user is logged-in to the present invention.

The metrics that may be considered by the expertise level analysis may include the following, although a skilled reader will recognize that these metrics are merely provided as examples and other metrics may be utilized:

1. How often a user visits certain key pages, which may provide the Category frequency, Page frequency and/or Feature frequency as metrics.
2. How long a user stays on certain key pages, which may provide the Interest indicator and Complexity indicator as metrics.
3. How many pages a user visits in a session, which may provide the Activity indicator as a metric.
4. Pages visited more than once per session, which may provide the Page Visits indicator as a metric.
5. Which buttons are clicked on for each page, which may provide the Button Frequency indicator as a metric.
6. How many e-mails the user receives, reads, composes and sends, saves for later and deletes, which may provide the Emails indicator as a metric.
7. Widget usage frequency may be tracked and may provide the Widget Usage Frequency indicator as a metric.

In one embodiment of the present invention a user may be initially set at the lowest expertise level upon registration. The user's expertise level may then be altered in accordance with the expertise level analysis. In another embodiment of the present invention, should the analysis identify the user as attaining a different expertise level than the expertise level identified when the user first logs-in then the expertise level for the functionalities of the present invention may be altered as experienced by a user while the user is logged-in. For example, the alteration in expertise level may be detected and applied after the user has read a predetermined number of emails, sent a predetermined number emails, and/or visited predetermined categories of webpages. Any alteration of expertise level does not have to only occur at the end of a session.

An alteration in expertise level may cause the following changes to occur, although a skilled reader will recognize that the following list is merely an example of possible outcomes of the alteration of an expertise level of a user and that other outcomes may occur:

1. Advanced and unused features, indicators, functions, buttons or textual information may be removed from the display (e.g. this may occur for users with low to mid expertise levels to simplify the present invention for such users)
2. Advanced and unused buttons may be hidden on the page (e.g. this may occur for users with low expertise levels to simplify the present invention for such users by diminishing the function options available to such users)
3. Functions and services that are rarely activated by the user may be moved to a webpage (e.g. of the Trusted Website) that is of a low hierarchy, for example, a webpage that is not the homepage
4. Users may be presented with additional text descriptions, prompts or queries to ascertain if a user requires additional assistance (e.g. this may occur for users with low to mid expertise levels to provide information about the functions and service options available to such users and the result of activating these functions and/or services)
5. "Pop up Tips" and/or "Did You Know?" windows or other advice windows may be provided to a user, said windows may include information that explains the features of the function or service, for example such windows may be provided for functions and/or services that are seldom used, and such windows may be provided on webpage, emails, and other functions and services of the present invention (e.g. this may occur for users with low to mid expertise levels)

In one embodiment of the present invention, aggregate metrics data from across the entire user community may be collected. This data may be utilized by the system, or the system developers, to improve the layout, navigation and user experience of the system. This data may further be utilized to review the user expertise parameters and make changes thereto.

Screen Overlay Buttons

As shown in FIG. 3, the system of the present invention may include a plug-in software component 204, that may further include operable software functions 206. The operable software functions may facilitate the display of screen elements, such as buttons, through the application of a browser widget. The term "widget" is the term applied to visible screen elements available in the Firefox browser, and similar extensions are provided by other browsers as well. The plug-in software component of the present invention provides a unique browser widget that displays elements as an overlay on a webpage. For example, the elements may be buttons, indicators, textual information (such as notices, information, etc.), as described above. These overlay elements of the present invention may assist a novice user, a user with limited computer expertise and/or a user with disabilities to access and navigate webpages, including a Trusted Website, an email application, the Internet or any other functions or services provided by the present invention.

One example of the overlay elements are buttons that are large and are overlaid on a webpage. The buttons may support activation of the functions of the web browser in a manner that causes the functions to be more obvious and clearer than the means of activating the functions supplied by the web browser in isolation.

The widget application of the present invention may utilize a combination of javascript code applicable to virtually all webpages and html objections inserted into each html page that is loadable by the web browser. When the present invention is utilized the buttons appear to be part of the webpage, but are overlaid over the page, so that the original page content is displayed and is not transformed prior to display. In one embodiment of the present invention when the one or more buttons are within a preset distance from the browser window edge, the widget will snap to the edge of that browser window to keep the look of the webpage tidy. This function of snapping to the edge of the browser window is well known in the art.

The widget application of the present invention may be utilized with virtually all webpages. As described above the exact buttons, indicators and/or textual information (such as information, warnings, messages, notices, etc.) overlaid on a webpage may be determined by a user's parameters, for example, such as a user's expertise level. Additionally, as described above buttons, indicators and/or textual information overlaid on a webpage may be moved (e.g. by dragging), hidden, minimized, maximized, etc. by a user. Hiding, minimizing and maximizing may occur as an input to an input means, such as a click of a mouse, touch of a touchscreen, strike of a key on a keyboard, etc. Minimized buttons, indicators and/or textual information may be moved by a user, for example, by dragging. This may be necessary in order for a user to view portions of a webpage that are otherwise obscured by an overlaid button, indicator, etc.

Figure 5:
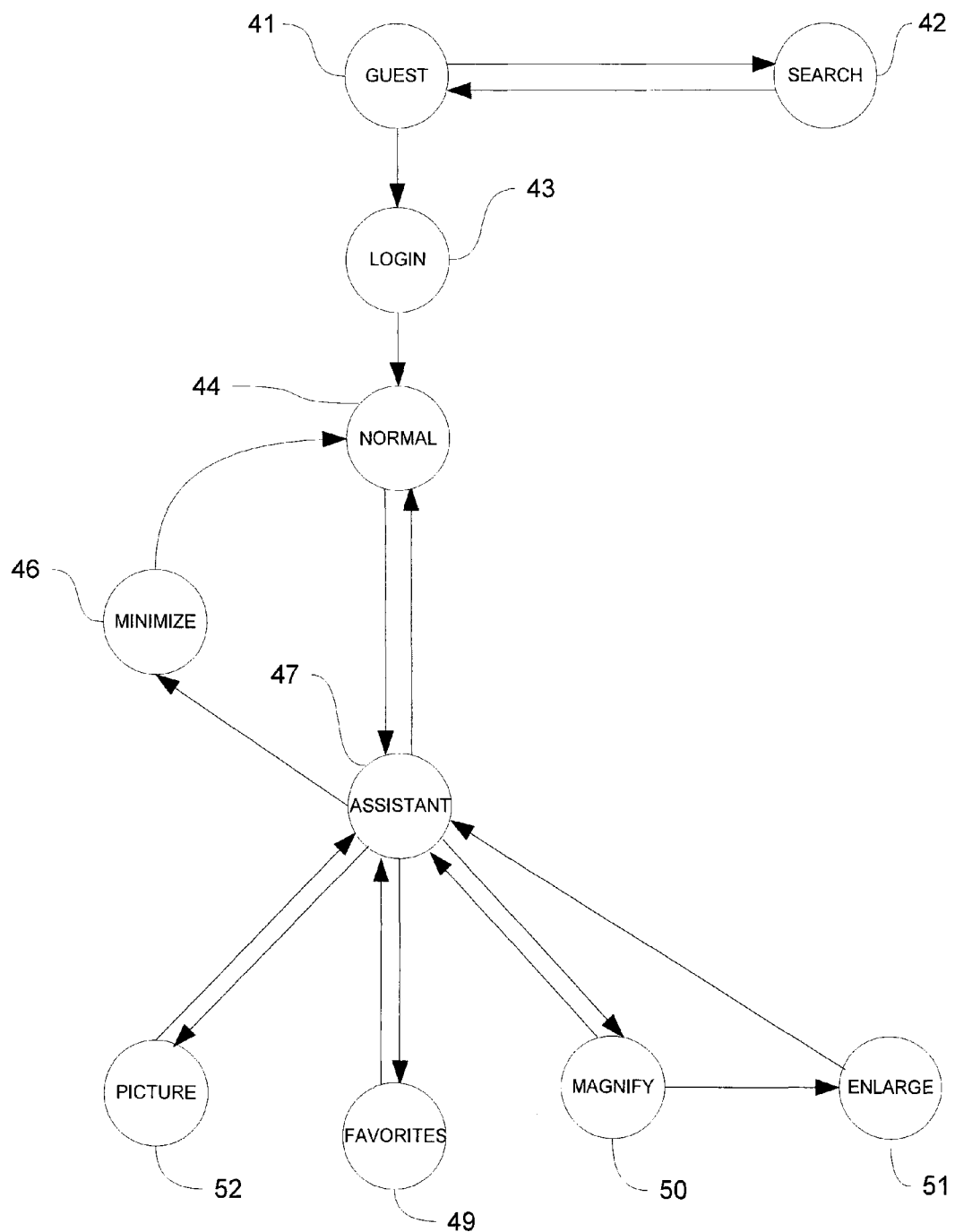
FIG. 5 is a components diagram of the overlay buttons of an embodiment of the invention.
Figure 7:
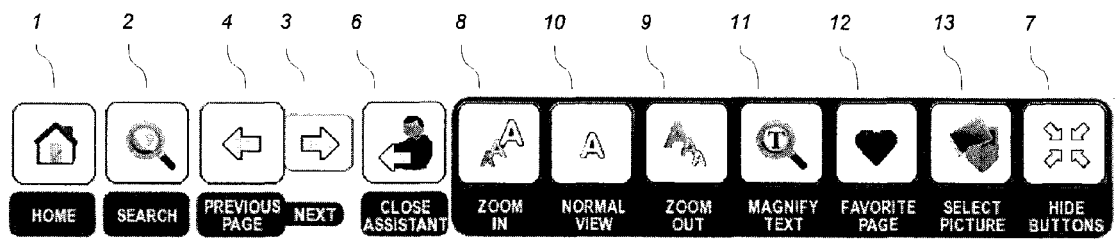
FIG. 7 shows a set of buttons that may be overlaid upon a webpage by the present invention.

An example of the widget application of the present invention is shown in FIG. 5, although a skilled reader will recognize that other configurations of the widget application are possible. FIG. 7 shows some of the buttons that may be generated by the widget application and overlaid upon a webpage. Each button may activate a function of the widget application, plug-in browser and/or webpage generally. Activation of a button may be achieved by a user through an input means, for example, such as by clicking on a mouse, pressing a key of a keyboard, or operation of any other input means. A skilled reader will recognize that other buttons may also be utilized in the present invention and that one or more of the buttons may be displayed upon a webpage at a time. The number and types of buttons displayed may be in accordance with user preference, with user needs, and any other consideration.

In an initial usage mode 41, for the purposes of this application the initial usage mode of the present invention is termed 'guest' mode, there may only be two buttons displayed; the Home button 1, as shown in FIG. 7 and the Search button 2, as shown in FIG. 7. Activation of a Search button 2 may generate the display a user-friendly search screen 42, as shown in FIG. 5. An example of a user-friendly search engine screen is shown as FIG. 2. A skilled reader will recognize that access may be provided to a Search button on other webpages as well and that activation of the Search button on any webpage may have the same result, that a search screen may be generated and displayed to a user. Users may further be able to utilize a "Go to webpage" button to automatically access a webpage or website that has been previously chosen by the user. Utilizing the "Go to webpage" button may therefore allow the user to bypass the search interface.

A skilled reader will recognize that the format and display of the search screen may be of a variety of formats, to assist novice users and/or users with disabilities.

Activation of the Home button 1, as shown in FIG. 7, may generate the loading of a designated home page 303, as shown in FIG. 5. The designated home page may be a variety of webpages specified by a user or the system, for example, such as the login screen of the Trusted Website, or a screen providing a user with specific function and service options.

To login, as shown in FIG. 5, during a login mode 43, to the present invention a user may input authentication information, for example, such as a username and password. After a user is logged-in a start-up screen, which may be displayed in a "normal" mode 44, may be displayed to a user. For example, a start-up screen may be a page that provides one or more navigation buttons, such as one or more of the navigation buttons shown on FIG. 4, and/or one or more of the buttons shown on FIG. 7. The start-up screen may be part of a Trusted Website, and may be designated as a homepage. A skilled reader will recognize that some embodiments of the present invention will not include a Trusted Website and/or a home page and for these embodiments aspects of the steps after login may be altered.

The buttons, including any navigation buttons, available to be activated by a user on any webpage, whether a webpage of the Trusted Website or any other Internet webpage, may be identified as belonging to one or more categories. For example, buttons may support browser functions, such as scrolling, moving back to a previously viewed webpage, moving forwards to a previously viewed webpage, etc. As another example, buttons may support functions controlling the viewing of a webpage (Assistant buttons) such as zooming in on text, highlighting text, copying and storing pictures, etc.

The Assistant buttons may not be automatically displayed to a user. In one embodiment of the present invention, as shown in FIG. 5, an Open Assistant button may be provided, and when activated may cause the display of one or more additional Assistant buttons 47. The Assistant buttons may include a Close Assistant button 6, as shown in FIG. 7, that when activated may hide the Assistant buttons and solely display the Open Assistant button. A Hide button 7, as shown in FIG. 7, may also be provided as an Assistant button that when activated may minimize the Assistant buttons and, as shown in FIG. 5 operate to create a minimized mode 46, so that the Assistant buttons are not displayed to the user. When the Assistant buttons are minimized a Show button may be displayed, that when activated may cause the Assistant buttons to be maximized and displayed to the user.

Assistant buttons may be arranged in a variety of manners as they are displayed to a user, for example, such as in a panel. Configurations of the display of a webpage created through the use of the Assistant buttons may be stored by the present invention. This stored data regarding a webpage configuration may be accessed when the same webpage is reaccessed and the data may be utilized to display the webpage in the same configuration to the user that the webpage was displayed in previously to the user, in accordance with the stored configuration data.

The present invention may further provide reminders, notices, or suggestions to a user based on a user's previous use of the present invention, including navigation behaviours of the user. Data may be stored by the present invention relating to the user's pervious use of the present invention and behaviour during Internet navigation. Based upon this data, the present invention may be operable to provide a variety of reminders, notices or suggestions. For example, if a user accessed an email account in a previous session, and does not access email during a present session, the present invention may suggest that the user access his email. As another example, the present invention may remind a user to check a weather webpage based upon prior use of the present invention. As yet another example the present invention may remind the user that there is waiting email in a user's email inbox, and may offer instructions to a user as to the steps involved in accessing the email if the user's behaviour suggests that the user has forgotten these steps. A user may turn this feature of the present invention on or off, and may set up specific reminders, notices or suggestions to be presented to a user during a session. Such reminders, notices, or suggestions provided to a user by the present invention may be of a variety of types, for example, such as pop-up messages appearing prominently on a screen displayed to a user. The reminders, notices or suggestions may appear for a period of time, or may require that a user respond to the reminder, notice or suggestion before it will be removed from the screen.

A user may navigate from one webpage to another webpage by either activating buttons that offer movement between webpages (such as buttons, as shown on FIG. 7, may facilitate moving forward 3, or backward 4, to previously viewed webpages) or by activating links on the page.

A user may also utilize the Search button 2, as shown in FIG. 7, to access a search engine screen which may be operated to navigate to any other webpage, or a list of available webpages corresponding to a search. If a list of search results is generated this list may be presented in a variety of formats in accordance with user parameters. For example, the list may be limited to display a specific number of options on the list to a user, such as ten options on the list, so that a user does not have to process a large number of listed options simultaneously. A skilled reader will recognize that other formats of search results may be utilized by the present invention in accordance with a user's experience level and/or disability.

A Home button 1, as shown in FIG. 7, may be displayed and activating this function may access a webpage designated as a homepage. A user may designate a homepage and/or the system may provide a default homepage. For example, a homepage may be the start-up webpage of the Trusted Website.

When the loaded webpage dimensions exceed the dimensions of the screen the widget application of the present invention may overlay Move Up, Move Down, Move Left, Move Right buttons as applicable to the dimensions of the webpage. For example, Move Up and Move Down buttons may only be displayed if the dimensions of the webpage are vertically larger than the screen and Move Left and Move Right buttons may only be displayed if the dimensions of the webpage are horizontally larger than the screen. The Move Up, Move Down, Move Left and Move Right buttons may collectively and/or individually facilitate scrolling functions that cause vertical scrolling and/or horizontal scrolling to be more easily achieved by the user than is possible in a general web browser without the present invention.

When the user logs-in to the present invention, the system may access the stored user parameters and may in accordance with the parameters add specific widget application attributes to a known webpage object with a specific identification (ID). Widget application attributes may include, enabled/disabled buttons (e.g. these may be determined in accordance with the expertise level of the user, or specific user preferences, or other criteria), button shape and style selection. The style selection may for example, be defined within the style attribute of an HTML object on a webpage. Style attributes may include particular user interface presentations, for example, such as shape, colour and/or opacity of the buttons. In one embodiment of the present invention, when the widget of the present invention detects the webpage object, it may extract the user-specific widget application attributes and configure the widget of the present invention accordingly to produce an overlay that corresponds to the user parameters. In this way each user can have an individually configured overlay display provided by the widget application of the present invention.

The overlay buttons, indicators and/or textual information may be altered to be tailored to a specific user, for example, as described above, in accordance with a user's expertise level. It may be possible for buttons, indicators and/or textual information, to be altered in either availability (e.g. whether the button is offered to a user), appearance (e.g. size), functionality and/or other in other manners. For example, the buttons displayed to a user with a low expertise level may include an image and text, whereas buttons displayed to a user with a high expertise level may include solely images. In this manner the present invention may be tailored to specific users. A skilled reader will recognize that the alterations to the buttons, indicators and/or textual information may be of many forms in accordance with the requirements and preferences of a user.

The widget application of the present invention may detect inactivity by a user over a specified period of time, for example, such as 30 minutes. Upon the end of the specified period of time, a screensaver page may be displayed by the present invention. The screensaver content may be of several formats. For example, the screensaver may display images, promotional information, etc. The application of a screensaver may also have the benefit of preventing screen burn. In one embodiment of the present invention the user may choose to include one or more photos from his or her photo album(s) or images stored in the users private data storage area as, or in, the screensaver.

In some instances, users may be uncertain as to whether a link, button or other feature has been activated, due to apparent inactivity by the computer. This can occur when a new webpage takes a long time to load, or the computer or Internet browser is processing for a significant period of time. In the instance the computer is loading or processing the widget application of the present invention may display an indicator. The indicator may generate visual display, such as a dynamic moving image, and/or textual display to indicate that processing or loading is occurring. A notice and/or warning that the user should not activate additional functions during the loading or processing may also be displayed. The indicator may be removed and no longer displayed to a user when the loading or processing is completed. This feature has the benefit of preventing the user from attempting to activate additional functions during the loading or processing period, as such additional functions may lengthen the processing or loading period or may cause the computer to freeze, preventing activation of additional functions may simplify the experience of the user while using the present invention.

The widget application of the present invention may also detect whether Internet connection has been lost or restored, using well-known browser technology. A notice and/or message indicator, that may be a visual and/or textual display, may be overlaid on the webpage in a prominent position to inform the user of the circumstance. It may be possible for the user to remove the notification or message so that it is no longer displayed by utilizing the input means, such as, for example by clicking on the mouse or touching a touch screen. This message/notice feature of the present invention offers a benefit in that it may explain in a more clear manner that the user cannot reach a particular website because the computer has lost the Internet connection and this in turn can clarify the cause of particular user experiences while using the present invention.

The widget application of the present invention may further offer a means of helping the user locate the pointer on the screen, such as a mouse pointed. The pointer may be difficult for a novice computer user or a person with disabilities to locate. In one embodiment of the present invention an input means, such as utilizing a keyboard to press keys in combination, for example, 'CNTRL' and 'Q' together, may cause the webpage to temporarily appear darker everywhere except around immediate location where the pointer is displayed on the screen. This pointer locator screen appearance of the screen will not time out. It will persist until the user either moves the point or enters an input into the input means to end the pointer locator screen appearance.

The browser plug-in component of the present invention, having a widget application embedded therein, may function so that it inserts a user-agent description into each webpage request generated by a user. As a result, any webpage, whether a webpage of a Trusted Website, or any other website specifically designed to recognize the presence of the browser plug-in component, can generate webpages in a manner compatible with the browser plug-in component of the present invention. This means that webpages are generated and the browser plug-in, utilizing the widget application embedded therein, may overlay buttons, indicators and/or textual information on the webpage.

A benefit of the interactivity of the browser plug-in component and the widget application is that information pertaining to the user, and in particular to the user's webpage access and navigation needs and preferences, may be accessed from the widget application and applied to the generation of the webpage and the overlay of the buttons, indicators and/or textual information. The webpage and the buttons, indicators and/or textual information may therefore be generated in a manner that causes the webpage to assist the user in accessing and navigating webpages.

In one embodiment, the website may arrange one or more elements of the webpage after the webpage is loaded, to make the one or more elements more easily accessible by the user. For example, elements of the webpage may be magnified, so as to appear more clearly to a user. The details regarding user needs and preferences stored by the widget application may be utilized to arrange one or more elements of the webpage in a manner that assists a novice user or a user with disability to access or navigate one or more webpages. In another embodiment, the website may generate a set of webpages that are specifically generated for accessibility by a senior citizen user.

The browser plug-in component of the present invention may insert a space underneath, above or to either side of each webpage that is displayed. The height of the space may be equal to the height of the overlay generated by the browser plug-in component of the present invention. The overlay may be generated to display in a horizontal or vertical manner. The space may be utilized so that content otherwise obscured or covered by the overlay may be visible when the page is scrolled to its limit where the space is located next to, for example scrolled to the bottom limit if the space is inserted under the bottom of the webpage. The edge of the webpage will be displayed and the overlay will be displayed in the inserted space. The user may therefore view the whole of the webpage by scrolling through the webpage and will not be required to move the overlay to view portions of the webpage. The overlay may always be displayed on the webpage, but the overlay remains in position as the webpage is scrolled and the location of the overlay in relation to the webpage content will change. Eventually the overlay may display over the inserted space and not cover the content of the webpage. The user may also choose to set parameters to cause the overlay to be exhibited as virtually transparent, so that the content under the buttons is partially visible at all times.

A skilled reader will recognize that the widget application of the present invention may have a variety of formats and configurations. For example, the overlay may be displayed or may not be displayed, pointer trails may be displayed or not be displayed, a cursor may appear as various sizes and colours, an overlay may be displayed a varying levels of transparency, a screensaver may be activated after varying specified periods of inactivity or may not be displayed at all, etc.

Some of the formats and configurations of the widget application may comply with user parameters, and some may be altered at any point by user request. Some of the formats and configurations of the widget application may be set as defaults. Also, an administrator may set the format and configuration of the widget application to be utilized in the guest mode of the present invention by utilizing to a specific customization page of the present invention. The guest mode may be the default parameters for new users, particular users, and/or guest users.

Assistant Panel

As described above the buttons of the present invention may include one or more Assistant buttons. The Assistant buttons activate functions or services that alter the display of a webpage to a user, or manage webpage content. In one embodiment of the present invention the one or more Assistant buttons may be displayed to a user as an Assistant Panel.

An example of an Assistant Panel is shown in FIG. 7, although a skilled reader will recognize that other configurations and functions of an Assistant Panel may be possible in accordance with the present invention. The possible elements of an Assistant Panel is shown in FIG. 5.

As shown in FIG. 5, when an Assistant Panel mode 47 is generated by the widget application of the present invention, a Zoom-in button 8, as shown in FIG. 7, may be displayed. Upon activation the Zoom-in button may enlarge the display of the content on the webpage. The Zoom-in button may offer a means of enlarging the display of the content on the webpage to a variety of sizes, for example, such as approximately 3-5 levels of zooming. A Zoom-out button 9, as shown in FIG. 7, may also be displayed. Upon activation of the Zoom-out button the display of the content on the webpage may reduced in size. The Zoom-out button may offer a means of reducing the size of the display of the content of the webpage to a variety of sizes.

A Normal View button 10, as shown in FIG. 7, may also be displayed and activated by a user to restore the content of the webpage to the original size that the page appears when browsed by a general web browser.

A Magnify button 11, as shown in FIG. 7, may be displayed and activated to enable a magnifying function to be applied to areas of content on a webpage and thereby magnify and increase or enlarge the size of the display of the selected content in specific regions of the webpage. As shown in FIG. 5, when the Magnify button is activated 50 the user may move the cursor over a particular block of text or other content on a webpage and the text block or other content block may be extracted and displayed as an enlarged block on the screen.

The user may use an input means to click on the enlarged block if the input means is a mouse, or touch on the enlarged block if the input means is a touch screen, to cause the enlarged block to be displayed in a highlighted enlarged mode 51, as shown in FIG. 7. For example, in a highlighted state a dark translucent background may be displayed over the webpage and the enlarged block may be displayed on top of the dark background to improve the legibility of the enlarged block. A skilled reader will recognize that other highlighted states may be achieved by the present invention to improve the visibility and/or legibility of the enlarged block.

The user may activate the Magnify button 11, as shown in FIG. 5, a second time to return the webpage to a display without any magnification of any portion of the content. As another option, the user may press a designated input device button, for example, such as the escape (ESC) keyboard key, to return the webpage to a display without any magnification of any portion of the content.

The Assistant Panel may include one or more buttons that have functions other than those related to the format of the display of a webpage. The Assistant Panel may include buttons that facilitate access to a webpage or other information. For example, as shown in FIG. 7, a Favourite Page button 12 may be displayed to a user. As shown in FIG. 5, when a Favourite Page button is activated, the user may access an Add Favourites mode 49. The Add Favourites mode may generate an Add Favourites webpage.

The location information, title information and/or other information pertaining to favourite webpages may be stored to the private data storage area of a particular user. The description of the favourite webpage may be set as the title of the webpage, or the user may input a tagname for the favourite webpage. The location information or a tag name indicating the favourite webpage or information may be displayed in the Add Favourites mode, and/or on the Add Favourites webpage that may be included in the Trusted Website. The location information or tag name may provide a link that may be utilized by a user to access the location of the webpage or information at a point in the future.

In one embodiment of the present invention, the user may be granted the option to either save the specific webpage the user had accessed as a favourite page, or the user may save the home page of the website to which the webpage belongs as a favourite page. For example, the user may save a specific webpage with a particular article (e.g. an article reporting a hockey match) of a newspaper website (e.g. the website of the Toronto Star), or the user may save the homepage of the newspaper website (e.g. the homepage of the Toronto Star). The user may save a specific webpage without actually having ever visited the homepage of the website pertaining to the webpage. The user may identify a favourite webpage as belonging to a particular category and may choose an existing category or create a new category for favourite webpages. As shown in FIG. 5, once the favourite webpage is stored, the user may return to the webpage that has been stored as a favourite webpage 47.

The Assistant Panel may also include buttons that store content from a webpage in a user's private data storage area. For example, a Select Picture button 13, as shown in FIG. 7, may be displayed and activated to access a Save Picture tool. The Save Picture tool may identify a photo or image included in the content of a webpage. Once identified the Save Picture tool may copy the photo or image and store the copy in the user's private data storage area. A link to the stored photo or image may be included in one or more webpages of a Trusted Website, such as one or more webpages for accessing photos saved by the user.

The Save Picture tool may function so that, when the Select Picture button 13 is activated, a picture selection mode 52 is activated, as shown in FIG. 5. The user may move the cursor across photos or images to highlight a particular image or photo. A highlighted image or photo may be displayed with a border and translucent background. A skilled reader will recognize that other means of highlighting a photo or image may also be utilized in accordance with the present invention. If user clicks on the photo or image if a mouse is the input means, or touches the photo or image if a touchscreen is the input means, the user may access the Save Picture webpage of the Trusted Website. The webpage may display the photo or image that the user has selected and any caption associated with the photo or image if a caption is available. In one embodiment of the present invention, an associated caption may be added or edited by the user. The photo or image, and any associated caption, may be stored to an existing photo/image album, or a new album may be created by a user for storage of the photo or image and any associated caption. Data corresponding to the photo or image may also be stored in the user's private data storage area, including any of the following: the image name, the caption, details of the webpage where the photo or image was located. The data is not restricted to photos and images and may include any digital content, for example, such as audio, video, documents, etc.

Some functions activated by the Assistant Panel buttons may be stored and reactivated in future user session of the present invention. For example, the Assistant Panel may permit a user to zoom-in or zoom-out on each webpage accessed to a different level of zoom. The widget application of the present invention may store the information regarding the level of zoom for each webpage accessed. If the user accesses the same webpage in the future the widget application may provide the webpage at the zoom level the user displayed the webpage at in the past, so that each webpage may be displayed at the last set zoom level it was previously displayed at. This feature may be applied to all webpages, including Internet webpages generally and Trusted Website webpages.

In one embodiment of the present invention the system may analyze the zoom-in and zoom-out usage by a user generally over a period of time. In the case that the analysis indicates a repeated zoom level utilized by a user on webpages accessed generally, the widget application may automatically assign the repeated zoom level to all webpages accessed by the user in the future. This feature may be applied to all webpages, including Internet webpages generally and Trusted Website webpages. If the feature of the present invention whereby the zoom level applied to webpages accessed previously is applied to the same webpages when a webpage is accessed in the future, then the application of a repeated zoom level may only be applied to new webpages accessed by the user, meaning webpages that the user has not previously accessed, or to webpages previously accessed to which no zoom level was applied.

The system may also utilize the analysis to determine the average, lowest common or other metric, zoom level utilized by a user if the user frequently uses the zoom feature, but does not repeatedly zoom to the same level. The widget application may apply the average zoom level to all webpages accessed by the user in the future. This feature may be applied to all webpages, including Internet webpages generally and Trusted Website webpages. If the feature of the present invention whereby the zoom level applied to webpages accessed previously is applied to the same webpages when a webpage is reaccessed in the future, then the application of an average zoom level may only be applied to new webpages accessed by the user, meaning webpages that the user has not previously accessed, or to webpages previously accessed to which no zoom level was applied. The user may also set a predefined zoom level in a configuration page on the Trusted Website and/or in the user parameters.

Link Mappings

In one embodiment of the present invention a link mapping mode may be provided to a user utilizing a keyboard as an input means. Some users may be required to utilize a keyboard as an input means to accommodate ease of computer use due to their particular disability.

Figure 6:
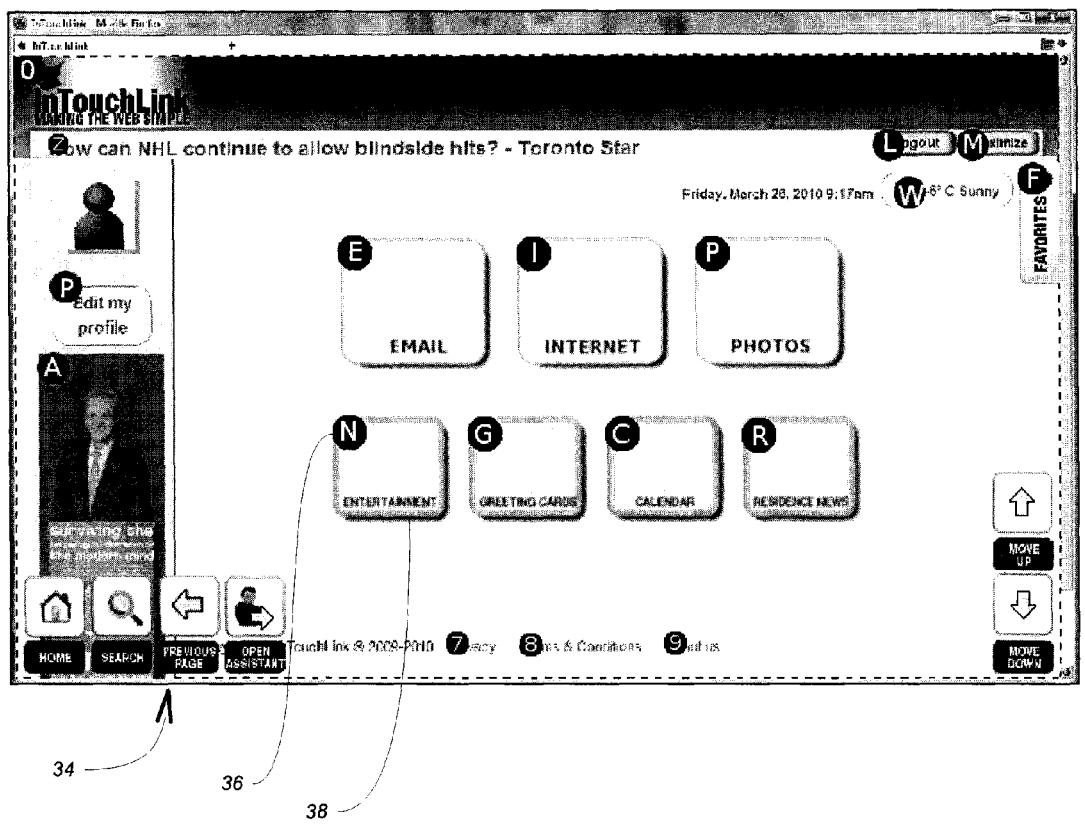
FIG. 6 shows a webpage displaying link mappings configured to a keyboard operable by a user in an embodiment of the present invention.

The link mapping mode maps the elements of a webpage. An example of the link mapping mode 34 is shown in FIG. 6, although a skilled reader will recognize that this embodiment of the present invention is provided merely as an example and other configurations of a link mapping mode may be utilized in accordance with the present invention. To activate the link mapping mode a key on the keyboard may be pressed, for example, such as the 'CTRL' key of a keyboard. A skilled reader will recognize that variety of keys of a keyboard can be applied to any input required in the link mapping mode. The same key of a keyboard, or a different key, may be pressed to deactivate the link mapping mode. A skilled reader will also recognize that input devices, or input means, other than a keyboard may be utilized for link mapping, the keyboard is used as an example in this application, but similar mapping of functions to specific inputs from an input device or means may be applied in the present invention.

When link mapping mode is activated the webpage that is currently accessed may be scanned by a javascript computer program. The javascript scan may be performed in a manner that is known. The scan may review specific regions of the webpage to identify all visible links or buttons that have a title attribute. A title attribute may be included in the definition within the HTML code relating to one or more links or buttons. For example, the first character included in the title attribute of a button and/or a link may be utilized to represent the character upon a keyboard that should be mapped for the purpose of activating the button or link. For example, if the title attribute of a "Help" button has the first character "H" then the "H" key on the keyboard should be mapped as the key to activate the Help button. Once the review is complete a marker, for example, such as a circle image with an alphanumeric character inside the circle, may be inserted into the webpage to mark the visible links or button on the page. The markers 36 may be displayed to the user to appear at the position of the link or button 38 upon the webpage, as shown in FIG. 6.

In one embodiment of the present invention, in link mapping mode the first letter in the link title attribute may be used as the alpha component of the link-mapping marker. For example, the user would press 'P' for the link titled 'Photos', 'L' for 'Logon', 'N' for 'news'. To activate any of the links or buttons marked on the page the user may type the character shown in the marker for the link or button choice. The characters may be any alphabetical key, A-Z. In another embodiment of the present invention, in order to prevent overuse of common alphanumeric characters, numeric characters may be used for parts of the pages that have common links. As shown in FIG. 6, the top images and the footer links are marked with numeric characters. A skilled reader will recognize that other markers may be utilized in the link mapping mode.

The link mapping mode may be activated on demand at the browser side and not the server side of the system. This may occur because some links may be generated and/or inserted in the webpage after the webpage has loaded. For example, some links may be generated and/or inserted in the webpage using HTML. Some links may have to be enabled and/or disabled based on region and visibility.

The position of the markers may vary. For example, the markers may be positioned at the top right hand corner of the link. This placement may be achieved through inserting html indicating "position: absolute". This indication ensures that the markers may not be positioned inline with the rest of the document object model (DOM). For example, markers may not be positioned inline with the rest of the webpage elements but may exist as an independent layer above the level of the rest of the webpage elements. A variety of positioning instructions are possible and these may require alternate or additional indications, for example, to ensure that markers are positioned correctly relative to the link with which the markers are associated, the parent of the link (usually a "div") may have a style attribute of "position: relative". A skilled reader will recognize the variety of positioning of markers that the present invention may include.

Upon the deactivation of the link mapping mode, inserted extra HTML code may be removed.

In the cases of special links and buttons the link or button may use a different letter to maintain consistency of function. For example, buttons that indicate related functions may all bear common marks. The common mark may be utilized for all related functions on a single webpage, as well as related functions on multiple webpages. For example related functions may include "exit", "close", "finished" and "return". These related functions appearing on one or more webpages may all bear common marks rather than marks that reflect the first alphabetic character of the title of the link or button. As an example the mark for "exit", "close", "finished" and "return" may be a common mark bearing the alphabetic character "X". Therefore when a user presses the "X" key on a keyboard the present invention will activate the function for "exit", "close", "finished" and "return", which is a common function for all these buttons. A skilled reader will recognize that other types of related links and/or buttons may exist on one or more webpages, and how common marks may be generated and applied to reflect consistency amongst special links and buttons.

Markers applied in the link mapping mode may include duplicates, for example, when there is a list on the page, such as an email list and multiple markers are generated bearing "E". In this instance when the "E" key is pressed on the keyboard by the user the webpage may generate and display to the user an additional list that designates numeric submarkers each link, for example submarker 1 to a first email in a list, submarker 2 to a second email in the list, and so on. The user may press the corresponding numeric key or combination of numeric keys to indicate the user's specific choice of a particular email. A skilled reader will recognize how secondary numeric markers attached to links with duplicate alphabetic markers may distinguish and clarify a user's choice of activities.

Sometimes a page may have invisible links that only become visible through some user interaction. Invisible links may not be assigned any link-mapping characters otherwise they may appear on the duplicates list which will surprise the user. An algorithm that allows examination of the webpage DOM tree, or element hierarchy/tree, to a specified depth to detect visibility may be utilized by the system, in a manner known by practitioners in the art. To detect invisible links, the system may also check the link and the link's parents as well because the link itself may not be invisible but it may be part of a DOM tree where some parent is invisible and therefore the link also becomes invisible.

It may further be possible to determine whether links that are visible should be excluded from the marked links. When a confirmation dialog, message dialog, duplicates dialog, address book or similar dialog appears only the links contained within must have link-mapping keys and not the layer underneath that may still be visible. To make sure that only a particular visible portion gets the link-mapping key assignments, the code may specify a particular region of a webpage, in which case only the links within that region may have link mapping markers applied thereto.

Sometimes there is a need to trigger a general event on screen that is displaying a webpage, and the general event is not directly relevant to the webpage and therefore does not have a marked link. To allow this to happen, a pseudo-link with a special attribute may inserted in the screen display during the loading or design of the webpage. For example the link may contain; <a type="itl-special-key" title="Press this key">. When activated as a link mapping this may have the result of triggering the activation of a parent link.

As a skilled reader will recognize, many variations of the link mapping mode may be utilized in accordance with the present invention, including the following:
- link mapping mode may function in accordance with default settings or may function in accordance with one or more parameters chosen by a user;
- the key or combination of keys to be pressed on a keyboard to activate, deactivate or otherwise utilize the link mapping mode may be mapped in a variety of configurations, in accordance with default settings or as chosen by a user; and/or
- one or more attributes of a link (e.g., the title, src, alt and href attribute, etc.) may be utilized to determine the alphanumeric character to be included in a marker associated with a link.

Auto-Resizing of Content

In one embodiment of the present invention, the text and other content of a webpage may be automatically adjusted in size in accordance with the size of the screen display. The screen display size may be set or chosen in accordance with a user's disability in order to facilitate ease of use of the present invention. The adjustment may occur due to the widget application of the present invention selecting a style sheet for the webpage that is specially adapted for the required screen display. The adjustment may also occur due to the widget application of the present invention programmatically creating the style sheet by calculating the style settings for the visual elements that can be resized. It may also be possible that the adjustment will occur due to the widget application programmatically adjusting the sizes of the images, text and other content of a webpage by means of client-side scripting. A skilled reader will recognize that the means and benefits for adjusting the size of a webpage will vary and that many different adjustment processes may be utilized in accordance with the present invention.

Categorization of Favourite Webpages

In one embodiment of the present invention, a webpage may be displayed to a user that comprises one or more category buttons that may be selected. The user may select a category of buttons and list of subcategories of buttons may be provided to a user. A skilled reader will recognize that several levels of categories and sub-categories of buttons may be presented to a user. This may be repeated until a page of content information is displayed. Virtually all webpages, including webpages of the Trusted Website and other webpages, may allow the user to mark and store the webpage details as a favourite webpage, which may in some instances be known as a bookmark.

The present invention offers a benefit over the prior art, in that the favourite websites stored by the present invention may be stored with reference to one or more categories, such categories being represented in the levels representing the hierarchy of categories. When the user is viewing a category in the hierarchy of categories on the Trusted Website and the user activates the Favourites button, he or she may see a list of favourites related to the said category. For example, if a user is viewing the category "Gardening", a list of favourite webpages previously stored in the category of "Gardening" may be displayed to the user. Should a user not find a suitable category selection to store a favourite website then the user can manually enter a category. In one embodiment of the present invention, the favourite websites may be set up and maintained by a person other than the user, for example, such as a family member of a user.

An additional benefit of the present invention over the prior art is that users are not inundated with a long list of favourites unrelated to the topic the user wishes to review. Automatic categorization of a list of favourites may be undertaken by the system of the present invention. A list of pre-identified websites and the categories associated with the pre-identified websites may be stored in the system. To identify the category of a website the system may examine the meta tag description provided for a webpage. Another means of identifying the category of a website may be that the system detects user behaviour, for example, if a user visits website A and consistently categorizes the webpages of website A as category X, the system will store the default category of webpages of website A as being category X. As described above, a user may also manually enter a category to be stored by the system.

It will be appreciated by those skilled in the art that other variations of the embodiments described herein may also be practiced without departing from the scope of the invention. Other modifications are therefore possible.

We claim:

1. A system for providing one or more browser functions operable by a user who is one or more of the following: a novice user or a user with disabilities, characterized in that the system comprises:
   a. a computer device linked to a display device;
   b. a browser interface operable by the computer device to provide access to one or more activity pages, including access to one or more webpages; and
   c. a browser plug-in component operable with the browser interface to provide to the user one or more function options selectable by a user for accessing, navigating within, and moving between the one or more activity pages, said function options being generated based upon activity data to be tailored to a specific user over time as a user's abilities improve or worsen and any disability of the user improves or worsens, such that the function options are presented to the user at each new session of use of the browser interface by a user in the one or more activity pages that are untransformed at an expertise level and a disability accommodation as appropriate in format, positioning and availability for the user to access, navigate, and move between the one or more activity pages, and said activity data pertaining to the activities of the user utilizing the one or more function options being collected by the system, and said function options including browser functions.

2. The system of claim 1, characterized in that it comprises the one or more function options including one or more of the following elements being overlaid on the one or more activity pages, including one or more webpages:
   i. one or more buttons operable by a user to activate and cause the performance of browser functions;
   ii. one or more indicators operable to indicate operations of the computer device or Internet to a user; and
   iii. one or more textual information operable to provide information to a user;

whereby the content of the one or more activity pages, including the one or more webpages, may be fully accessible by the user; and whereby the overlay elements generate access and navigation of the one or more activity pages, including the one or more webpages, by the user at the expertise level appropriate to the user.

3. The system of claim 2, characterized in that the one or more buttons are presented to the user in format, size, shape, style and content consistent with the expertise level appropriate to the user.

4. The system of claim 1, characterized in that it comprises the one or more webpages being accessible via Internet or intranet connections.

5. The system of claim 1, characterized in that is comprises the browser plug-in dynamically augmenting the content of the one or more webpages.

6. The system of claim 1, characterized in that the one or more function options include one or more user preferences to be set by the user.

7. The system of claim 1, characterized in that the activity data is stored to one or more data storage means linked to the computer device.

8. The system of claim 1, characterized in that the system exists in a cloud computing environment.

9. A method of browser functions for accessing and navigating one or more options by a user who is one or more of the following: a novice user, or a user with disabilities, characterized in that the method comprises the following steps;
   a. initiating a browser session by authenticating the user;
   b. recognizing an expertise level of the user for the browser session;
   c. applying a browser plug-in component operable with a browser interface and thereby providing one or more function options selectable by a user for accessing, navigating within, and moving between one or more activity pages to the user, said one or more activity pages including one or more webpages, and generating the one or more function options based upon the expertise level of the user and any disability of the user and thereby presenting said one or more function options in the one or more activity pages that are untransformed to be compatible in format, positioning and availability with the expertise level of the user and a disability accommodation for the user, and said function options including browser functions; and
   d. the user utilizing the one or more function options to access, and navigate within, and move between the one or more activity pages.

10. The method of claim 9, characterized in that it comprises the further step of presenting the one or more function options as one or more of the following:
   a. one or more buttons operable by a user to activate and cause the performance of browser functions;
   b. one or more indicators operable to indicate operations of the computer device or Internet to a user; and
   c. one or more textual information operable to provide information to a user;
to fully access the content of the one or more activity pages.

11. The method of claim 9, characterized in that it comprises the further step of recognizing the expertise level of the user to be varying expertise levels for one or more different sessions.

12. The method of claim 9, characterized in that it comprises the further steps of:
   a. collecting activity data pertaining to the: utilization of the one or more function options by the user, and access and navigation of the one or more activity pages by the user;
   b. storing the activity data in one or more data storage means;
   c. analyzing the activity data to generate one or more metrics; and
   d. utilizing the one or more metrics to recognize the expertise level of the user to be applied in the session; and
   e. utilizing the activity data and metrics to generate the one or more function options for a new session of the browser interface initiated by the user in accordance with the expertise level and disability accommodation relevant to the user that may improve or worsen over time.

13. The method of claim 9, characterized in that it comprises the further step of accessing and navigating the one or more activity pages that include at least one of the following:
   a. one or more webpages;
   b. one or more pages for viewing photographs;
   c. one or more pages for displaying, drafting, saving or sending email; and
   d. one or more pages presenting institutional information, said one or more institutional information pages being accessible if the user is an institutional member.

14. The method of claim 9, characterized in that it comprises the further steps of the user setting one or more user preferences; and the one or more user preferences being stored in one or more data storage means.

15. The method of claim 14, characterized in that it comprises the further step of an authorized user accessing and setting the one or more user preferences.

16. The method of claim 9, characterized in that it comprises the further step of presenting only the one or more function options available to the user pertaining to one of the one or more activity pages accessed by the user.

17. The method of claim 9, characterized in that it comprises the further step of the user hiding or moving the one or more function options on one of the one or more activity pages accessed by the user.

18. The method of claim 9, characterized in that it comprises the further step of displaying the one or more function options as a browser widget.

19. The method of claim 9, characterized in that it comprises the further step of presenting requests, notices or suggestions to the user.

* * * * *